United States Patent
Cui et al.

(10) Patent No.: US 10,750,133 B2
(45) Date of Patent: Aug. 18, 2020

(54) SYSTEMS AND METHODS FOR AUTOMATIC VIDEO RECORDING

(71) Applicant: Honeywell International Inc., Morristown, NJ (US)

(72) Inventors: Xiaozhi Cui, Shanghai (CN); YunBin Chen, Shanghai (CN); Tao Song, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 51 days.

(21) Appl. No.: 15/833,613

(22) Filed: Dec. 6, 2017

(65) Prior Publication Data
US 2019/0174102 A1    Jun. 6, 2019

(51) Int. Cl.
- *H04N 5/77* (2006.01)
- *H04N 7/18* (2006.01)
- *G08B 13/196* (2006.01)
- *G06K 9/00* (2006.01)

(52) U.S. Cl.
CPC ....... *H04N 7/188* (2013.01); *G08B 13/19613* (2013.01); *H04N 5/77* (2013.01); *H04N 7/18* (2013.01); *H04N 7/183* (2013.01); *G06K 9/00335* (2013.01); *G06K 9/00771* (2013.01); *G08B 13/19669* (2013.01)

(58) Field of Classification Search
None
See application file for complete search history.

(56) References Cited

U.S. PATENT DOCUMENTS

| | | | |
|---|---|---|---|
| 6,028,626 A | 2/2000 | Aviv | |
| 7,339,607 B2 | 3/2008 | Damabhorn | |
| 8,922,658 B2 | 12/2014 | Galvin | |
| 2010/0177207 A1* | 7/2010 | Fukuda | H04N 1/2166 348/222.1 |
| 2012/0106782 A1* | 5/2012 | Nathan | G06K 9/00771 382/103 |
| 2014/0004834 A1* | 1/2014 | Mian | G06F 3/017 455/414.1 |
| 2015/0052146 A1* | 2/2015 | Soon-Shiong | G06F 16/7837 707/740 |

(Continued)

FOREIGN PATENT DOCUMENTS

CN    106358079 A    1/2017

OTHER PUBLICATIONS

English language translation of Bibliographic data and Abstract of CN106358079 (A).

(Continued)

*Primary Examiner* — Edemio Navas, Jr.
(74) *Attorney, Agent, or Firm* — Seager, Tufte & Wickhem, LLP

(57) ABSTRACT

Systems and methods for automatically triggering a video recording in response to detecting a predetermined condition or a security event are provided. Some methods can include receiving a video data stream from a surveillance camera, analyzing the video data stream to determine whether an individual depicted within the video data stream exhibits fear or duress, and automatically storing the video data stream in response to detecting that the individual depicted within the video data stream exhibits the fear or the duress.

20 Claims, 2 Drawing Sheets

(56) References Cited

U.S. PATENT DOCUMENTS

| | | | |
|---|---|---|---|
| 2015/0110460 A1* | 4/2015 | Choi | H04N 5/222 386/224 |
| 2016/0021308 A1* | 1/2016 | Kozko | H04N 5/23238 348/36 |
| 2016/0321671 A1* | 11/2016 | Chandrasekaran | G06K 9/00255 |
| 2017/0208362 A1* | 7/2017 | Flores | H04N 21/44218 |
| 2017/0264739 A1* | 9/2017 | Smith | G10L 25/51 |
| 2017/0303851 A1* | 10/2017 | Iacoviello | A61B 5/00 |

OTHER PUBLICATIONS

English language translation of Description of CN106358079 accessed electronically on May 24, 2017.

\* cited by examiner

SYSTEMS AND METHODS FOR AUTOMATIC VIDEO RECORDING

FIELD

The present invention relates generally to surveillance systems. More particularly, the present invention relates to systems and methods for automatically triggering a video recording in response to detecting a predetermined condition or a security event.

BACKGROUND

In known security systems, one or more surveillance cameras capture video of a secure area. The surveillance cameras transmit the captured video to a network video recorder (NVR), and the NVR stores the captured video according to predetermined rules. For example, known NVR systems store the captured video according to a panic recording process when a user (e.g. guard or home owner) presses a panic recording key.

However, the guard may be unable to press the panic recording key when the guard is outside of a monitoring room and on patrol or investigating suspicious activity away from the monitoring room. Additionally or alternatively, the guard may fail to press the panic recording key because the guard failed to notice a security event in a video feed. For example, the guard may fail to notice the security event because the guard is distracted or focused on a video feed other than the video feed capturing the security event. In some circumstances, the guard might be particularly susceptible to missing the security event if he or she is monitoring a high number of video feeds (e.g. 10 or more). Similarly, the home owner may be unable to press the panic recording key because he or she is under duress.

In view of the above, there is a continuing, ongoing need for systems and methods for automatic video recording.

DETAILED DESCRIPTION

Figure 1:
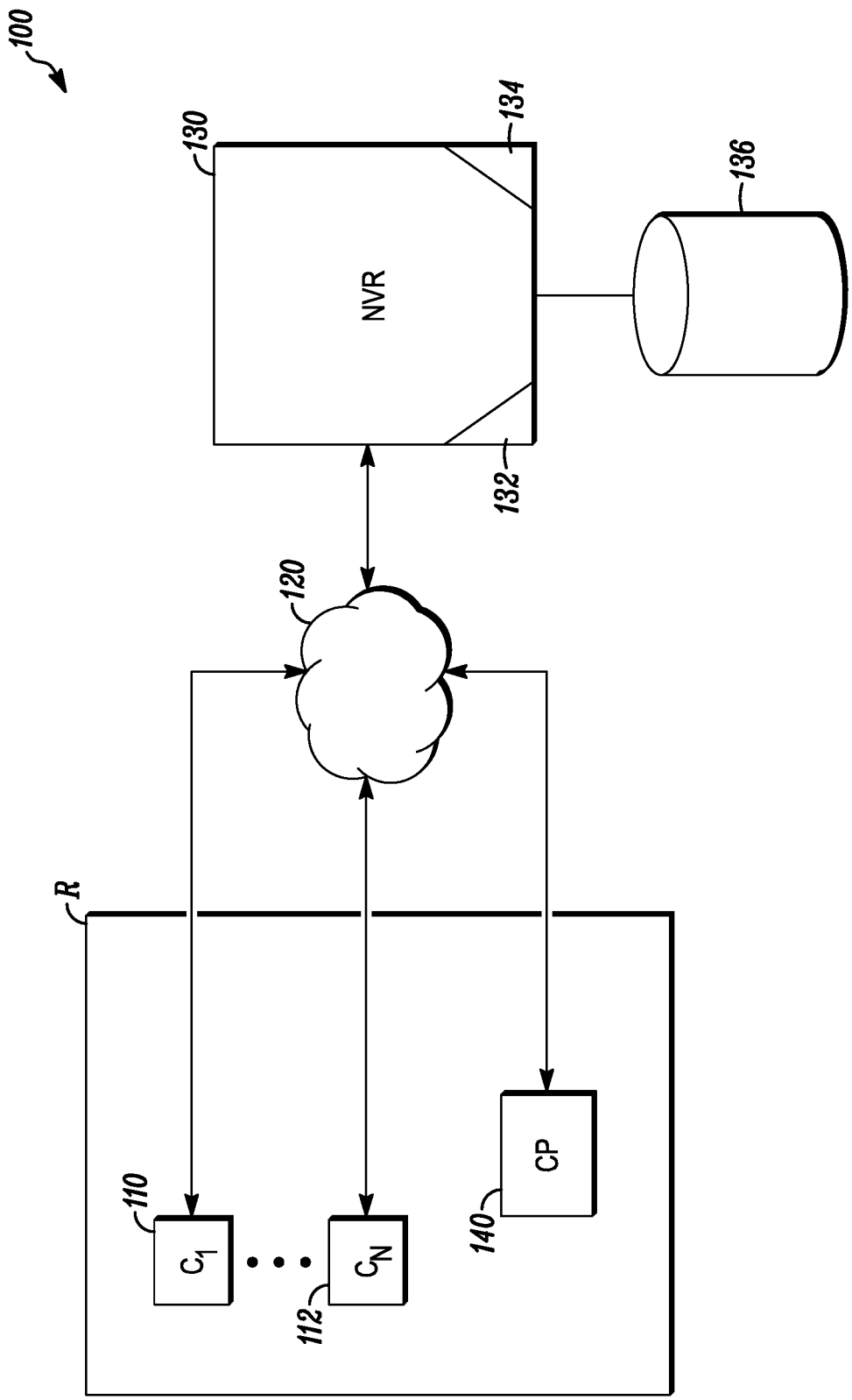
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for automatically triggering a network video recorder (NVR) system to record a panic video in response to the NVR system detecting a predetermined condition in a video data stream or detecting a security event. For example, in some embodiments, the predetermined condition can include a panic condition, an action by an individual, a frightened individual, or an individual under duress, and in some embodiments, the security event can include a detected alarm, an emergency situation (hostage or injured person), a detected robbery, a detected fire, detected motion, an occurrence of a predetermined time, a security system being armed, a user depressing a predetermined key, or a security sensor being triggered. In some embodiments, the NVR system can be included in a security system, and in some embodiments, the NVR system can analyze the video data stream from one or more surveillance cameras to detect the predetermined condition. Furthermore, in some embodiments, the security event can be triggered by a sensor other than the one or more surveillance cameras of the security system.

In some embodiments, recording the panic video may be a function of the NVR system, and the NVR system can store the panic video from the one or more surveillance cameras in response to the predetermined condition or the security event. However, in the absence of the predetermined condition or the security event, the NVR system can refrain from storing the panic video. In some embodiments, the NVR system can record the panic video regardless of whether the security system is in an armed or unarmed mode, and in some embodiments, the NVR system can store the panic video in a database or other computer readable medium. In some embodiments, the security system can transmit a silent or audible alarm while recording the panic video, but in some embodiments, systems and methods disclosed herein can record the panic video without any external indication thereof.

In some embodiments, the NVR system can detect frightened or otherwise under duress individuals within a secure area by analyzing video data streams from the one or more surveillance cameras in the secure area. For example, to detect the frightened individuals, the NVR system or another computer device can receive one or more basis images of frightened individuals before analyzing the video data streams, and the individuals captured in the basis images of frightened individuals may or may not be individuals who live, work, or are associated with the secure area. Subsequently, the NVR system or other computer device can analyze the basis images of frightened individuals to generate a template of expected facial features of a frightened individual. For example, the NVR system or other computer device can identify locations and sizes of facial features (e.g. eyes, mouth, eyebrows) in the basis images of frightened individuals to generate the template of expected facial features of the frightened individual. In some embodiments, the NVR system or other computer device can determine that the frightened individual generally has wide eyes, an open mouth (e.g. screaming or yelling), and furled brows. Then, the NVR system can compare facial expressions of individuals captured in the video data streams to the template of expected facial features of the frightened individual to determine if any of the individuals captured in the video data streams are frightened or otherwise under duress. In some embodiments, the NVR system can detect a face in the video data streams and compare pixels representing only the face in the video data streams to the template of expected facial features of the frightened individual; other pixels of the video data streams can be ignored.

Additionally or alternatively, the NVR system can compare the facial expressions of the individuals captured in the video data streams to one or more of the basis images of frightened individuals to determine whether the facial expressions of the individuals captured in the video data streams are similar to the basis images of frightened individuals. In some embodiments, the NVR system can use a scoring system to determine similarities between a first facial expression of a first individual captured in the video data streams and a first basis image of frightened individuals. If a comparison between the first facial expressions of the first individual captured in the video data streams and the first basis image of frightened individuals exceeds a threshold score, then the NVR system can determine that the first individual is frightened or otherwise under duress.

In some embodiments, the NVR system can analyze more than just facial expressions when analyzing the video data streams to determine whether any individuals captured in the video data streams are frightened or otherwise under duress. For example, the NVR system can detect body movements or body positions that are indicative of the predetermined condition. In some embodiments, the NVR system can detect when an individual captured in the video data streams is lying motionless on the ground, the individual is on his knees, or both hands of the individual are raised for an extended period of time (e.g. 10-15 seconds), are raised on both sides or behind a head of the individual, or have open palms. Responsive thereto, the NVR system can determine that the individual is frightened, under duress, held at gunpoint, or near an armed individual. Furthermore, in some embodiments, when the NVR system determines that a first individual's hands have been raised for the extended period of time, the NVR system can determine whether a second individual is near the first individual to confirm that a dangerous person is in the secure area. In some embodiments, the NVR system can analyze the video data streams to detect whether the second individual has a weapon, such as a gun.

It is to be understood that systems and methods disclosed herein, including the NVR system, can be executed and controlled by a surveillance system and that the surveillance system can include a plurality of surveillance system cameras, a control panel device, a network, and a server device (e.g. an NVR system). It is to be further understood that some or all of the surveillance system, the plurality of surveillance system cameras, the control panel device, the network, and the server device can include a user interface device, a memory device, and a transceiver device each of which can be in communication with control circuitry, one or more programmable processors, and executable control software as would be understood by one of ordinary skill in the art. The executable control software can be stored on a transitory or non-transitory computer readable medium, including, but not limited to local computer memory, RAM, optical storage media, magnetic storage media, flash memory, and the like.

FIG. 1 is a block diagram of a system 100 in accordance with disclosed embodiments. As seen in FIG. 1, the system 100 can include a plurality of surveillance system cameras 110, 112 monitoring a region R, and the plurality of surveillance system cameras 110, 112 can capture video of the region R. In some embodiments, the plurality of surveillance system cameras 110, 112 can be wired or wirelessly connected to a network 120, and the plurality of surveillance system cameras 110, 112 can transmit the video to an NVR system 130 over the network 120. Additionally or alternatively, in some embodiments, the plurality of surveillance system cameras 110, 112 can transmit the video to a control panel 140, and the control panel 140 can transmit the video to the NVR system 130 over the network 120.

The NVR system 30 can include one or more programmable processors 132 and executable control software 134 as would be understood by one of ordinary skill in the art. The executable control software 134 can be stored on a transitory or non-transitory computer readable medium, including, but not limited to local computer memory, RAM, optical storage media, magnetic storage media, and the like. In some embodiments, the programmable processor 132 and the control software 134 can execute and control some of the methods as described above and herein.

The NVR system 130 can receive the video from the plurality of surveillance system cameras 110, 112 and can store some or all of the video in a database 136 responsive to detection of a predetermined condition or a security event. For example, the NVR system 130 can store the video in the database 136 when the programmable processor 132 detects a panic condition, an action by an individual in the video, a frightened individual in the video, an individual under duress in the video, a detected alarm, an emergency situation (hostage or injured person), a detected robbery, a detected fire, detected motion in the video, an occurrence of a predetermined time, a security system being armed, a user input depressing a predetermined key, or a security sensor being triggered. In some embodiments, the NVR system 130 can refrain from storing the video absent detection of the predetermined condition or the security event.

In some embodiments, the programmable processor 132 can detect the frightened individual in the video responsive to analyzing the video and detecting therein a frightened facial expression by an individual in the region R. For example, detecting the frightened facial expression by the individual can include comparing a detected face in the video with an image or template of a frightened individual. Additionally or alternatively, in some embodiments, the programmable processor 132 can detect that the individual in the region R is under duress responsive to analyzing the video and detecting therein a predetermined body position or predetermined body movements (e.g. both hands raised) of the individual in the region R.

As seen in FIG. 1, the plurality of surveillance cameras 110, 112 and the control panel 140 can be located in the region R. However, in some embodiments, the NVR system 130 can be located in the region R, and in some embodiments, the NVR system 130 can be located outside of the region R.

Figure 2:
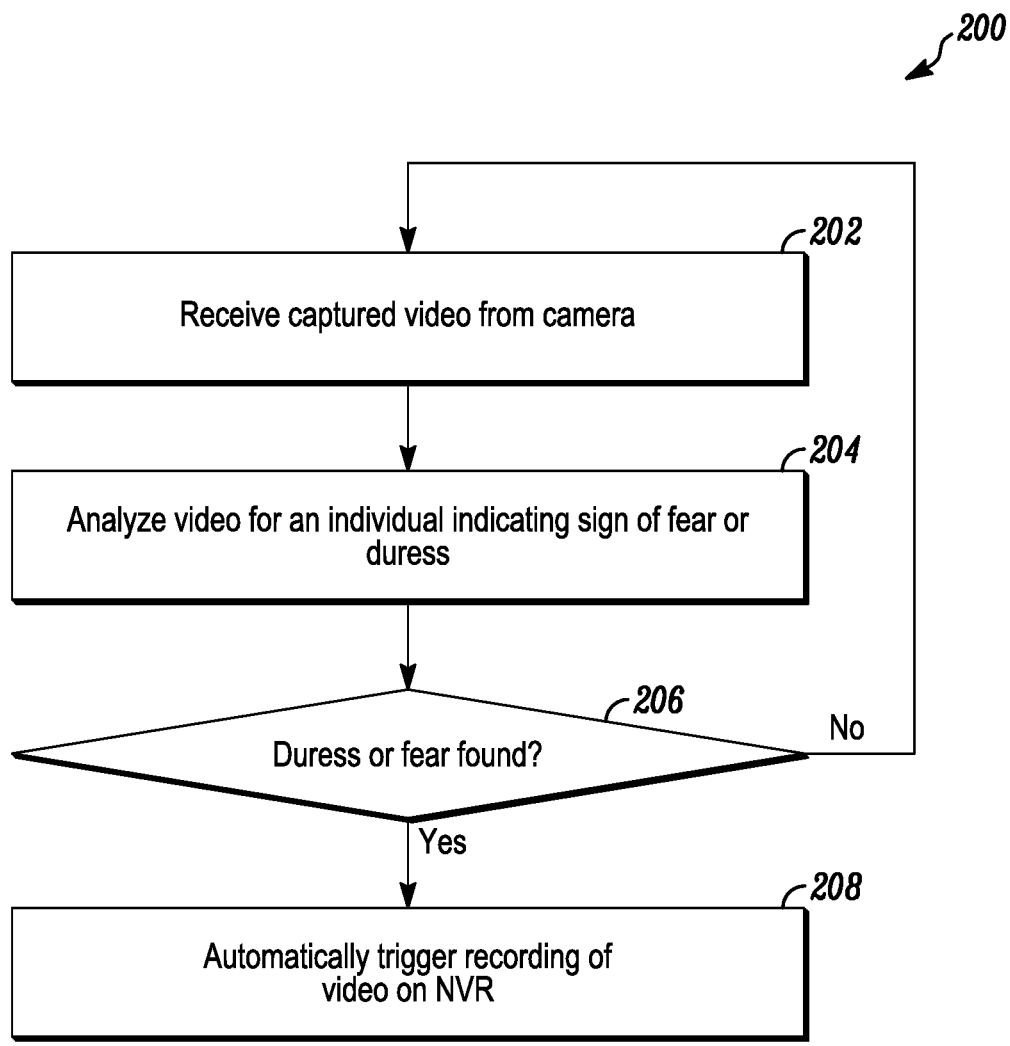
FIG. 2 is a flow diagram of a method in accordance with disclosed embodiments.

FIG. 2 is a flow diagram of a method 200 in accordance with disclosed embodiments. As seen in FIG. 2, the method 200 can include an NVR system receiving captured video from one or more surveillance cameras as in 202, and the NVR analyzing the captured video for indications of duress or fear exhibited by one or more individuals in a secure area as in 204. For example, the NVR can detect the duress or the fear exhibited by the one or more individuals in the secure area based on facial expressions, body movements, or body positions of the one or more individuals in the secure area. The method 200 can also include the NVR system determining whether the captured video includes the indications of the duress or the fear exhibited by the one or more individuals in the secure area as in 206 and, upon detecting the fear or the duress as in 206, automatically recording the captured video in response to detecting the fear or the duress exhibited by the one or more individuals in the secure area as in 208. However, when the NVR system fails to detect the fear or the duress exhibited by the one or more individuals in the secure area in the captured video as in 206, the method 200 can continue receiving the captured video as in 202.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    receiving a video data stream from each of a plurality of surveillance cameras that are part of a security system, the plurality of surveillance cameras monitoring a secure region;
    not storing all of the plurality of video data streams corresponding to the plurality of surveillance cameras to a network video recorder of the security system;
    analyzing the plurality of video data streams to determine whether an individual depicted within any one of the plurality of video data streams exhibits fear or duress; and
    automatically storing all of the plurality of video data streams corresponding to all of the plurality of surveillance cameras to the network video recorder of the security system in response to detecting that the individual exhibits fear or duress.

2. The method of claim 1 wherein determining whether the individual exhibits fear or duress includes detecting a frightened facial expression exhibited by the individual.

3. The method of claim 2 wherein detecting the frightened facial expression exhibited by the individual includes comparing a first image of a face of the individual to a template.

4. The method of claim 3 further comprising:
    receiving a plurality of second images of one or more frightened individuals; and
    generating the template by determining facial feature sizes and facial feature locations of the one or more frightened individuals in the plurality of second images.

5. The method of claim 2 wherein detecting the frightened facial expression exhibited by the individual includes comparing a first image of a face of the individual to a second image of a frightened person.

6. The method of claim 1 wherein determining whether the individual exhibits fear or duress includes detecting whether a body position or a body movement of the individual indicates fear or duress.

7. The method of claim 6 wherein detecting whether the body position or the body movement of the individual indicates fear or duress includes detecting whether both hands of the individual have been raised for at least a predetermined period of time.

8. The method of claim 6 wherein detecting whether the body position or the body movement of the individual indicates fear or duress includes detecting whether the individual is lying motionless for at least a predetermined period of time.

9. The method of claim 6 wherein detecting whether the body position or the body movement of the individual indicates fear or duress comprises detecting whether the individual is kneeling.

10. The method of claim 1 further comprising triggering an alarm in response to detecting that the individual exhibits fear or duress.

11. A system comprising:
    a surveillance camera of a security system for monitoring a secure region;
    a transceiver device;
    a programmable processor; and
    executable control software stored on a non-transitory computer readable medium,
    wherein the transceiver device receives a video data stream from the surveillance camera,
    wherein the programmable processor and the executable control software execute not storing the video data stream on a video recorder of the security system,
    wherein the programmable processor and the executable control software analyze the video data stream to determine whether an individual depicted within the video data stream exhibits fear or duress in response to a security event presently occurring in the secure region,
    wherein the programmable processor and the executable control software detect a frightened facial expression exhibited by the individual to determine whether the individual within the video data stream exhibits fear or duress, and
    wherein the programmable processor and the executable control software automatically store the video data stream on a video recorder of the security system in response to detecting that the individual depicted within the video data stream exhibits the fear or the duress.

12. The system of claim 11 wherein the programmable processor and the executable control software compare a first image of a face of the individual to a template to detect the frightened facial expression exhibited by the individual.

13. The system of claim 12 wherein the programmable processor and the executable control software receive a plurality of second images of one or more frightened individuals and generate the template by determining facial feature sizes and facial feature locations of the one or more frightened individuals in the plurality of second images.

14. The system of claim 11 wherein the programmable processor and the executable control software compare a first image of a face of the individual to a second image of a frightened person to detect the frightened facial expression exhibited by the individual.

15. The system of claim 11 wherein the programmable processor and the executable control software detect whether a body position or a body movement of the individual indicates fear or duress to determine whether the individual within the video data stream exhibits fear or duress.

16. The system of claim 15 wherein the programmable processor and the executable control software detect whether both hands of the individual have been raised for at least a predetermined period of time to detect whether the body position or the body movement of the individual indicates fear or duress.

17. The system of claim 15 wherein the programmable processor and the executable control software detect whether the individual is lying motionless for at least a predetermined period of time to detect whether the body position or the body movement of the individual indicates fear or duress.

18. The system of claim 15 wherein the programmable processor and the executable control software detect whether the individual is kneeling to detect whether the body position or the body movement of the individual indicates fear or duress.

19. A method comprising:
receiving a video data stream from each of a plurality of surveillance cameras that are part of a security system, the plurality of surveillance cameras monitoring a secure region;
not storing all of the plurality of video data streams corresponding to the plurality of surveillance cameras to a network video recorder of the security system;
analyzing the video data stream from each of the plurality of surveillance cameras to determine whether an individual depicted within any of the video data streams exhibits a frightened facial expression in response to an event presently occurring in the secure region;
automatically storing the video data streams from all of the plurality of surveillance cameras in response to detecting that the individual exhibits a frightened facial expression.

20. The method of claim 19, further comprising:
analyzing the video data stream from each of the plurality of surveillance cameras to determine whether an individual depicted within any of the video data streams exhibits a body position or a body movement that indicates fear or duress; and
automatically storing the video data streams from all of the plurality of surveillance cameras in response to detecting that the individual exhibits a body position or a body movement that indicates fear or duress.

* * * * *